(12) United States Patent
Dow

(10) Patent No.: US 7,098,720 B1
(45) Date of Patent: Aug. 29, 2006

(54) HIGH IMPEDANCE THERMAL SHUTDOWN CIRCUIT

(75) Inventor: Ronald Neal Dow, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 358 days.

(21) Appl. No.: 10/290,714

(22) Filed: Nov. 8, 2002

(51) Int. Cl.
  *G05F 3/26* (2006.01)
  *G05F 3/22* (2006.01)

(52) U.S. Cl. ............ 327/513; 327/538; 323/907; 323/315; 361/103

(58) Field of Classification Search ........ 327/512, 327/513, 538, 539; 323/313, 315–316, 907; 361/103
See application file for complete search history.

(56) References Cited

U.S. PATENT DOCUMENTS

| | | | | |
|---|---|---|---|---|
| 5,359,236 A | * | 10/1994 | Giordano et al. ........ | 327/512 |
| 5,448,174 A | * | 9/1995 | Gose et al. ........ | 327/513 |
| 5,654,861 A | * | 8/1997 | Pennisi ........ | 361/103 |
| 6,580,261 B1 | * | 6/2003 | Dow ........ | 323/315 |
| 6,717,530 B1 | * | 4/2004 | Schmidt et al. ........ | 340/870.17 |

* cited by examiner

*Primary Examiner*—Timothy P. Callahan
*Assistant Examiner*—Terry L. Englund

(57) ABSTRACT

A thermal shutdown circuit board integrated circuit device. The thermal shutdown circuit includes a current source for receiving a current bias and generating an output current in accordance therewith. The current source is configured to produce the output current in a manner proportional to absolute temperature. A current mirror is coupled to the current source. The current mirror is configured to mirror the output current from the current source and is configured to have a high output impedance. A thermal shutdown transistor is coupled to control one output of the current mirror. The thermal shutdown transistor is also coupled to receive the output current and shutdown the output current at a temperature threshold in a manner dependent on shutdown circuit operating temperature.

12 Claims, 3 Drawing Sheets

HIGH IMPEDANCE THERMAL SHUTDOWN CIRCUIT

FIELD OF THE INVENTION

The field of the present invention pertains to a thermal protection circuitry for electronic devices. More particularly, the present invention relates to a circuit for implementing automatic thermal protection for integrated circuit devices.

BACKGROUND OF THE INVENTION

Electronic devices are being used today to perform a wide variety of tasks. Many different areas of business, industry, government, education, entertainment, and most recently, the home, are tapping into the enormous and rapidly growing list of applications developed for today's increasingly powerful electronic devices. Such devices include, for example, handheld electronic devices such as mobile instrument equipment, portable computers, portable medical electronics devices, and fixed electronic devices such as machine tool controllers, large server computer systems, and robotic servo mechanisms.

As electronic devices and machines controlled by electronics become increasingly ubiquitous and widespread in their use, there is increasing interest in improving the performance and the functionality of the electronics. For example, increasing the performance and software execution speed of computer system devices is of great interest.

There are many methods used by designers to increase the functionality of electronic devices. For example, with digital computer systems, software execution speed is increased by increasing the processor "clock speed." Another method used by designers, with both digital electronics and analog electronics, is to increase the density of the electrical components within integrated circuit dies. For example, many high-performance integrated circuit processors include tens of millions of transistors integrated into a single die (e.g., 60 million transistors or more). As density increases, the operating speeds possible within a given design also increase, for example, as circuit traces are packed ever more closely together. Another method for increasing performance is to increase the efficiency of heat removal from a high-density high-performance integrated circuit. As component density increases, the thermal energy that must be dissipated per unit area of silicon also tends to increase. To maintain high performance, stable operating temperature must maintained. Accordingly, the use of carefully designed heat dissipation devices (e.g., heat sink fans, liquid cooling, heat spreaders, etc.) with high-performance processors has become relatively standardized.

Thus, performance enhancing techniques such as increased component density, increased clock speed, and increased heat dissipation are carefully balanced in order to obtain an optimum performance level. Over heating leads to erratic functional behavior of the device, such as, for example, computational errors, unpredictable behavior, or even physical destruction of the device. As more and more functions are integrated into smaller and smaller semiconductor dies, the operating speeds can be increased, however, the resulting increased switching activity leads to greater heat generation. Additionally, circuits having a high degree of integration are generally much more sensitive to thermal overloads and are more easily damaged by excessive heat. Such circuits tend to the specifically designed to function with very small operating currents, thus, current spikes related to thermal transients can easily damage them.

To protect such sensitive circuits from damage, is desirable to provide thermal protection which functions to shut down, or otherwise limit, current to a given electronic device when the device operates outside of safe thermal limits. Such thermal protection circuitry needs to be tailored to the operating conditions of the overall incorporating electronic device. In the case of a low power devices, the thermal protection circuitry needs to function properly while consuming low power. For example, in some electronic systems, like low operating current regulators, there is a need for a thermal shutdown circuit that will operate at about 1 microamp.

Generally, a thermal shutdown circuit for an integrated circuit device acts like a thermometer in that it senses a die temperature and shuts down the normal function of the device when the temperature exceeds a given threshold, or shutdown temperature (e.g., approximately 180 deg C.). Since the operating current of the integrated circuit device is much reduced during thermal shutdown, there is no chance that internal dissipation will significantly raise the operating temperature of the integrated circuit device during the shutdown. Thus, in the case of a regulator integrated circuit device, effective thermal protection circuitry makes the device practically "blowout" proof.

There exists problems with prior art thermal shutdown circuits. Prior art thermal shutdown circuits often employ large resistors in their design. The large resistors lead to correspondingly large back gates, or "tubs", which in turn produce a corresponding back gate leakage current, or tub leakage current. Since the tub leakage current doubles with every 10 degrees centigrade, the size of the resistor needs to be quite large (e.g., 9M) in order to compensate for the change in resistance caused by the tub leakage current. Additionally, the changing tub leakage current causes the shutdown voltage to change as temperature changes, making the actuation of the shut down less accurate. Additionally, prior art thermal shutdown circuits often required circuit elements, such as zener diodes, that limit the voltages the device can process.

Thus, what is required is a thermal shutdown circuit for integrated circuit devices that is dependent on device temperature. What is require is a circuit that is independent of the tub/substrate diode leakage currents. Additionally, the required solution should not required excessively large resistors and should not require a large operating current. The present invention provides a novel solution to these requirements.

SUMMARY OF THE INVENTION

Embodiments of the present invention provide a thermal shutdown circuit for integrated circuit devices that is dependent on device temperature. Embodiments of the present invention provide a circuit that is independent of the tub/substrate diode leakage currents. Additionally, embodiments of the present invention do not require excessively large resistors and do not require a large operating current.

In one embodiment, the present invention is implemented as a thermal shutdown circuit board integrated circuit device. The thermal shutdown circuit includes a current source for receiving a current bias and generating an output current in accordance therewith. The current source is configured to produce the output current in a manner proportional to absolute temperature. A current mirror is coupled to the current source. The current mirror is configured to mirror the output current from the current source and is configured to have a high output impedance. A thermal shutdown transistor is coupled to control the current mirror. The thermal shutdown transistor is also coupled to receive the output current and shutdown the current mirror at a temperature threshold in a manner dependent on shutdown circuit operating temperature.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention provide a thermal shutdown circuit for integrated circuit devices device that is dependent on device temperature. Embodiments of the present invention provide a circuit that is independent of the tub/substrate diode leakage currents. Additionally, embodiments of the present invention do not require excessively large resistors and do not require a large operating current.

Figure 1:
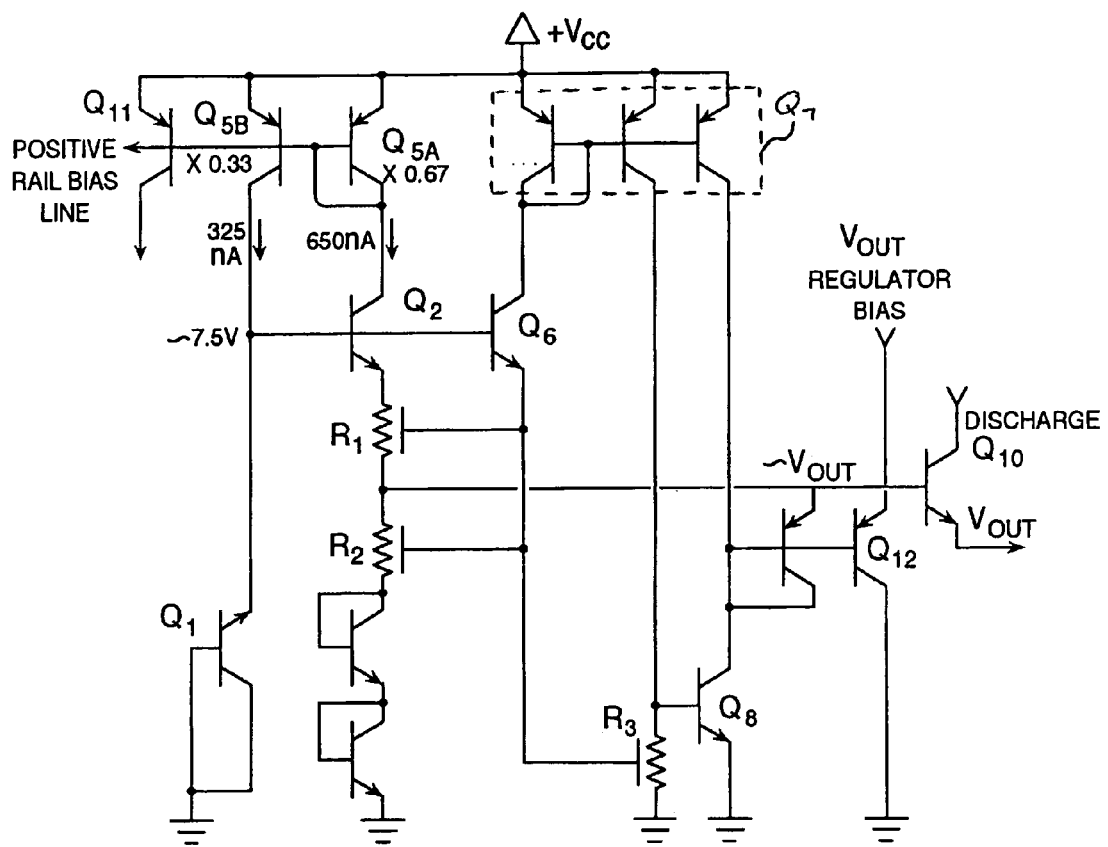
FIG. 1 shows a thermal shutdown circuit including a large current limiting resistor and operating in a manner dependent upon back gate leakage currents.

FIG. 1 shows a thermal shutdown circuit 100 including a large current limiting resistor (e.g., 9M Ohm) and operating in a manner dependent upon back gate leakage currents.

As well known by those skilled in the art, many electronic devices operate in a manner sensitive to high electrical currents and, correspondingly, temperatures. For example, low operating current voltage regulators are particularly sensitive to operating temperature and the currents flowing through them. Such devices are particularly well-suited for the inclusion of thermal shutdown circuits, such as the thermal shutdown circuit 100.

In this embodiment, thermal shutdown circuit is configured to operate at around 1 microamp. Generally, the thermal shutdown circuit 100 acts like a thermometer in that it senses the die temperature and shuts down the normal function of the device (e.g., the voltage regulator) when the temperature exceeds the shutdown temp (e.g., approximately 180 deg C.). In so doing, the inclusion of the thermal shutdown circuit 100 makes the protected device (e.g., the voltage regulator) "blowout" proof.

In the circuit 100 embodiment, the 9M Ohm resistor is comprised of the two individual resistors R1 and R2, which together, add up to 9M Ohms. The two resistors R1 and R2 set the bias current for the circuit 100 and are made of a 5K per square implant resistor material. This bias current passes through the emitter of transistor Q2. The transistor Q2's collector current is coupled to establish the bias current in transistor Q5 and the rest of the transistors in the positive rail bias line (e.g., transistors Q11, Q5b, and Q5a). The backgate or tubs of the resistors R1 and R2 are connected to the emitter of transistor Q6. The collector of transistor Q6 is connected to the current mirror transistor Q7 whose output is connected to the resistor on the base of transistor Q8. Since the tub's leakage current doubles about every 10 deg C., the resistor value of R3 can be choosen so the transistor Q8 turns on at the shutdown temperature and pulls down transistor Q10, the discharge transistor.

It should be noted that as illustrated in FIG. 1, certain transistors of circuit 100 are depicted with their associated gains. For example, the gain of transistor Q5B is 0.33 (e.g., X0.33) and the gain of transistor Q5A is 0.67 (e.g., X0.67). This same convention holds true in FIG. 2 and FIG. 3.

Referring still to the circuit 100 embodiment of FIG. 1, the discharge transistor Q10 emitter is connected to the output voltage and it's base is connected to a point on the 9M Ohm resistor (e.g., R1 and R2) that approximates the output voltage but is independant of it. Since the discharge is part of the supercharge circuit that charges the output in case there is sudden increase in the load current on the output, it is important to pull the base terminal low if one wants to reduce Vout to ground. Also connected to transistor Q8 is the base of transistor Q12 whose emitter is connected to the Vout output regulator bias.

It should be noted that in the circuit 100 embodiment of FIG. 1, the size of the 9M Ohm resistor (e.g., R1 and R2) is about 250 square mils. Unfortunately, this is excessively large. The 5K Ohm per square mil implant resistor fabrication process is relatively old. More modern manufacturing processes can provide resistance values of 2K Ohm per square mil. Unfortunately, this would use 2.5 times the silicon area than the older process. It would be preferable to eliminate the zener diode connected transistor Q1, for compatibility with modern integrated circuit fabrication processes. The inclusion of the diode connected transistor Q1 generally limits the supply voltage and makes it difficult to produce the low values of output voltage currently available. Thus, because of these reasons, the circuit 200 embodiment shown in FIG. 2 below is a preferred embodiment of the present invention.

Figure 2:
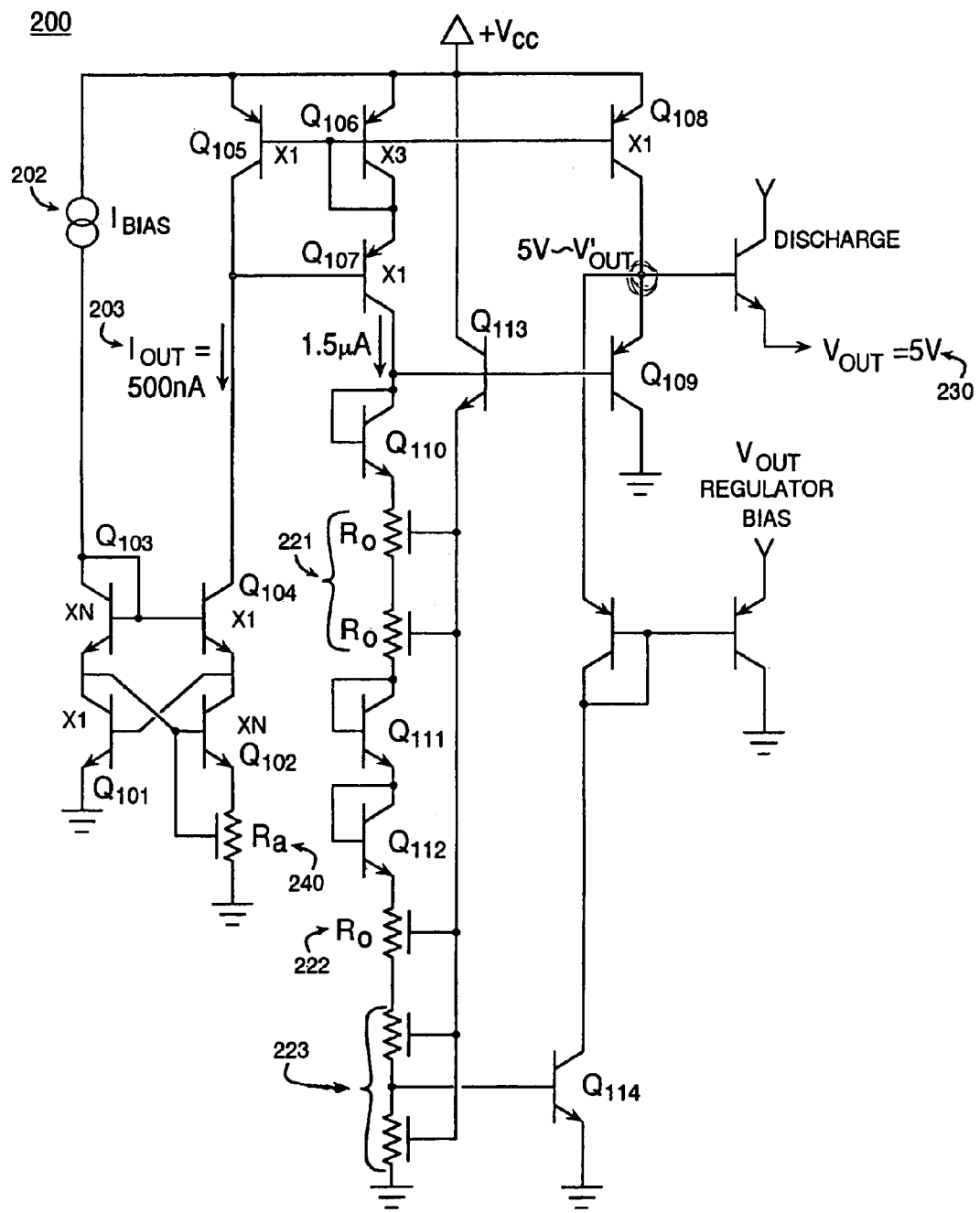
FIG. 2 shows a shutdown circuit in accordance with a preferred embodiment of the present invention.

FIG. 2 shows a shutdown circuit 200 in accordance with a preferred embodiment of the present invention. In this embodiment, the thermal shutdown circuit 200 includes a current source (e.g., transistors Q101–Q104) for receiving a current bias and generating an output current 203 in accordance therewith. The current source/bias generator is configured to produce the output current in a manner proportional to absolute temperature. A current mirror (e.g., transistors Q105–Q108) is coupled to the current source. The current mirror is configured to mirror the output current 203 from the current source and is configured to have a high output impedance. A thermal shutdown transistor Q114 is coupled to control the current mirror. The thermal shutdown transistor Q114 is also coupled to receive mirrored current from the transistor Q107 (e.g., approximately 1.5 uA) and shutdown an output of the current mirror at a temperature threshold in a manner dependent on shutdown circuit 200 operating temperature.

In the present circuit 200 embodiment, the Ibias current source 202 provides start up current to the current source transistors Q101 through Q104. The design equation for this circuit is as follows:

$$Iout=(2kT/q)\times\ln(N)/Ra$$

In the present embodiment, Iout 203 is dependent on the resistor value Ra, geometries of the transistors Q101–Q104, and some physical parameters including absolute temperature. As a result, Iout 203 is Proportional To Absolute Temperature (PTAT) and is nominally independant of Ibias 202. This is true if Ra has about a zero temperature coefficient. However, if Ra has about a +3300 (ppm/deg C) temperature coefficient, this nominally matches the temperature coefficient in the numerator in the equation above and Iout is mostly constant with temperature.

Referring still to the shutdown circuit 200 embodiment of FIG. 2, Iout 203 is mirrored by the current mirror comprising transistors Q105 through Q108. The transistor Q107 will have a very high output impedance since it forms a cascode with transistor Q106. The transistor Q108 will have a much lower output impedance and drives the emitter of the transistor Q109.

In the present embodiment, if the current in the collector of transistor Q108 doubles, the output voltage on the emitter of transistor Q109 goes up by 18 mV @27 deg C. The current from the collector of transistor Q107 will drop through a resistor chain comprising several diodes and resistor values (e.g., the diode connected transistors Q110, Q111, Q112, and resistors 221–223. The resistor voltage drops across the resistors 221–223 will be PTAT and can be matched with the diode drops (e.g., the diode connected transistors Q110, Q111, Q112) to form separate bandgaps that sum to the output voltage 230.

Thus, using the resistor voltage drops across the resistor chain, near zero temperature coefficients can be formed for output voltages of, for example, 1.25V, 2.5V, 3.75V, 5V etc. The resistor 223 of the resistor chain nearest ground can be divided so that a base connection can be made with the thermal shutdown transistor Q114. The tub or backgate of resistor Ra 240 is connected to the emitter of Q103. The leakage currents for the tub/substrate diode, which is far larger than the tub/resistor diode, will come from the Ibias current source 202, and the current flowing through the emitter of Q102 will be mostly due to the resistor Ra 240.

In the present embodiment, all the tubs or backgates of the bandgap resistors (e.g., the resistors 221–223) are connected to the emitter of transistor Q113. This is so the current for the tub/substrate diodes, which doubles every 10 deg C., can come from the emitter of transistor Q113 which passes to the positive supply. Thus, the shutdown voltage generated by the thermal shutdown transistor Q114 is generated independent of substrate diode leakage currents of the bandgap resistors (e.g., the resistors 221–223) of the thermal shutdown circuit 200.

Figure 3:
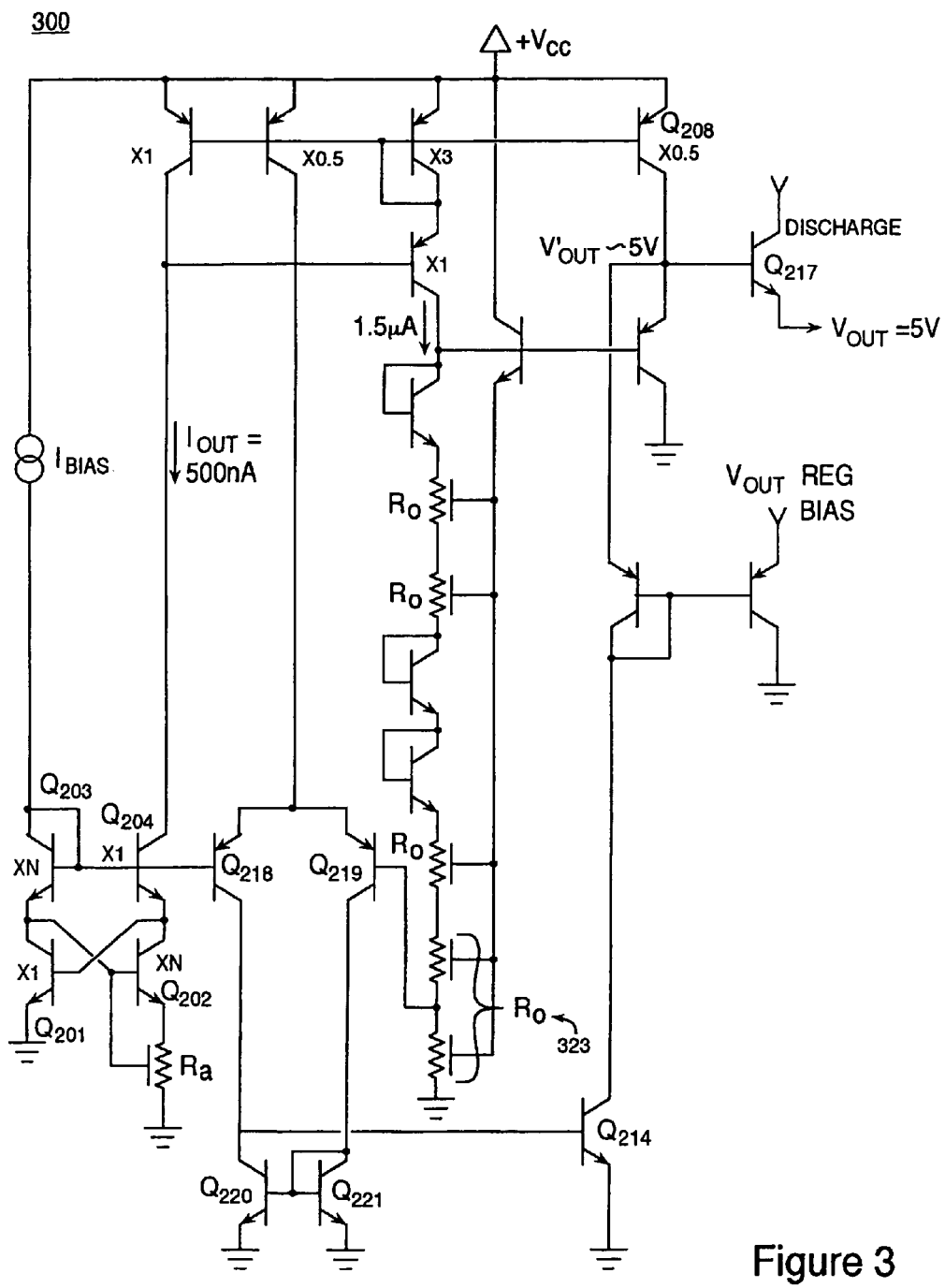
FIG. 3 shows a thermal shutdown circuit in accordance with an alternative embodiment of the present invention that employs a comparator on the shutdown transistor.

FIG. 3 shows a thermal shutdown circuit 300 in accordance with an alternative embodiment of the present invention. In the circuit 300 embodiment, a comparator (e.g., comprising transistors Q218–Q221) is placed between bottom R0 323 tap point and the base of the transistor Q214. The inverting input of the comparator has been connected to the top of the four transistor current source/bias generator (e.g., transistors Q201–Q204). The exact position of the noninverting input on the bottom R0 resistor 323 will determine the thermal shutdown point. Biasing for the comparator has been taken by fragmenting the collector current of transistor Q208 while leaving the original collector connected to the base of transistor Q217. The advantage of the circuit 300 embodiment is higher gain of the shutdown transistor Q214, no pulldown resistor like R3 for the base of transistor Q214 and no high voltage pnp transistor(s) like transistor Q7 being required, as in the circuit 100 embodiment above in FIG. 1. The transistors Q218 to Q221 can be made from love voltage material.

Thus, the shutdown voltage at the base of transistor Q114 is derived from the PTAT current source and is independent of the tub/substrate diode leakage currents. Also the zener voltage has been eliminated and the size of the resistor tubs has been reduced from 250 square mils to 180 square mils with a resistor change of 5K Ohm per square mil to 2K Ohm per square mil.

Thus, embodiments of the present invention provide a thermal shutdown circuit for integrated circuit devices that is dependent on device temperature. Embodiments of the present invention provide a circuit that is independent of the tub/substrate diode leakage currents. Additionally, embodiments of the present invention do not require excessively large resistors and should not require a large operating current.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A thermal shutdown circuit, comprising:
   a current source for receiving a current bias and generating an output current in accordance therewith for an initial startup period, the current source configured to produce the output current in a manner proportional to absolute temperature and after the initial startup period is configured to produce the output current in a manner independent of the current bias;
   a current mirror coupled to the current source, the current mirror configured to mirror the output current from the current source; and
   a thermal shutdown transistor coupled to control one output of the current mirror, the thermal shutdown transistor also coupled to shutdown a discharge transistor such that an output voltage of the discharge transistor is zero at a temperature threshold in a manner dependent on the thermal shutdown circuit operating temperature.

2. The thermal shutdown circuit of claim 1, further comprising:
   a chain of resistive devices comprising at least one diode and at least one resistor and for generating a plurality of voltage drops in a manner proportional to absolute temperature, the chain of resistive devices coupled to receive another output of the current mirror.

3. The thermal shutdown circuit of claim 2, further comprising:

a base connection implemented between the chain of resistive devices and the thermal shutdown transistor, wherein the base connection controls the temperature threshold of the thermal shutdown transistor.

4. The thermal shutdown circuit of claim 1 wherein a shutdown voltage generated by the thermal shutdown transistor is generated independent of resistor tub substrate diode leakage currents of the thermal shutdown circuit.

5. A voltage regulator device having a thermal shutdown circuit for implementing thermal protection, comprising:
   a voltage regulator circuit for producing an output voltage, the voltage regulator circuit including a thermal shutdown circuit producing an output current to enable the voltage regulator circuit, the thermal shutdown circuit comprising:
      a current source for receiving a current bias and generating the output current in accordance therewith for an initial startup period, the current source configured to produce the output current in a manner proportional to absolute temperature and after the initial startup period is configured to produce the output current in a manner independent of the current bias;
      a current mirror coupled to the current source, the current mirror configured to mirror the output current from the current source; and
      a thermal shutdown transistor coupled to control one output of the current mirror, the thermal shutdown transistor also coupled to shutdown a discharge transistor such that an output of the discharge transistor is zero at a temperature threshold in a manner dependent on the thermal shutdown circuit operating temperature.

6. The voltage regulator device of claim 5, further comprising:
   A chain of resistive devices comprising at least one diode and at least one resistor and for generating a plurality of voltage drops in a manner proportional to absolute temperature, the chain of resistive devices coupled to receive another output of the current mirror.

7. The voltage regulator device of claim 6, further comprising:
   a base connection implemented between the chain of resistive devices and the thermal shutdown transistor, wherein the base connection controls the temperature threshold to shutdown the discharge transistor at the temperature threshold.

8. The voltage regulator device of claim 5 wherein a shutdown voltage generated by the thermal shutdown transistor is generated independent of substrate diode leakage currents of the thermal shutdown circuit.

9. A thermal protection circuit for an integrated circuit device, comprising:
   a current source for receiving a current bias and generating an output current in accordance therewith for an initial startup period, the current source configured to produce the output current in a manner proportional to absolute temperature and after the initial startup period is configured to produce the output current in a manner independent of the current bias;
   a current mirror coupled to the current source, the current mirror configured to mirror the output current from the current source; and
   a thermal shutdown transistor coupled to control one output of the current mirror, the thermal shutdown transistor also coupled to shutdown a discharge transistor such that an output of the discharge transistor is zero at a temperature threshold in a manner dependent on thermal protection circuit temperature.

10. The thermal protection circuit of claim 9, further comprising:
   a chain of resistive devices for generating at least one voltage drop in a manner proportional to absolute temperature, the chain of resistive devices coupled to receive another output of the current mirror.

11. The thermal protection circuit of claim 10, further comprising:
   a base connection implemented between the chain of resistive devices and the thermal shutdown transistor, wherein the base connection controls the thermal shutdown transistor to shutdown the discharge transistor at the temperature threshold.

12. The thermal protection circuit of claim 11 wherein a shutdown voltage generated by the thermal shutdown transistor is generated independent of substrate diode leakage currents of the thermal protection circuit.

* * * * *